US012435485B2

(12) United States Patent
Torii et al.

(10) Patent No.: US 12,435,485 B2
(45) Date of Patent: Oct. 7, 2025

(54) WORK TOOL MOUNTING MECHANISM

(71) Applicant: Kubota Corporation, Osaka (JP)

(72) Inventors: Shin Torii, Osaka (JP); Koshiro Hirakawa, Osaka (JP)

(73) Assignee: Kubota Corporation, Osaka (JP)

( * ) Notice: Subject to any disclaimer, the term of this patent is extended or adjusted under 35 U.S.C. 154(b) by 519 days.

(21) Appl. No.: 17/975,815

(22) Filed: Oct. 28, 2022

(65) Prior Publication Data

US 2023/0132291 A1 Apr. 27, 2023

(30) Foreign Application Priority Data

Sep. 9, 2021 (JP) .................................. 2021-147177

(51) Int. Cl.
*E02F 3/36* (2006.01)

(52) U.S. Cl.
CPC .......... *E02F 3/3636* (2013.01); *E02F 3/3663* (2013.01)

(58) Field of Classification Search
CPC ..... E02F 3/3631; E02F 3/3636; E02F 9/2271; E02F 3/3663
See application file for complete search history.

(56) References Cited

U.S. PATENT DOCUMENTS

| | | | |
|---|---|---|---|
| 3,243,066 A | 3/1966 | Gardner et al. | |
| 6,899,509 B1 * | 5/2005 | Mailleux | E02F 9/2275 37/468 |
| 6,991,398 B2 * | 1/2006 | Leemans | E02F 3/3663 403/324 |
| 9,051,716 B2 * | 6/2015 | Bricker | E02F 3/3636 |

FOREIGN PATENT DOCUMENTS

JP 2020-172796 A 10/2020

OTHER PUBLICATIONS

Extended European Search Report issued in corresponding European Patent Application 22203865.5 dated Mar. 20, 2023 (6 pages).

* cited by examiner

*Primary Examiner* — Abiy Teka
(74) *Attorney, Agent, or Firm* — Osha Bergman Watanabe & Burton LLP

(57) ABSTRACT

A working tool mounting mechanism for a tractor, includes: an extensible cylinder that is disposed on a tip of a boom of a front loader of the tractor, and comprises a cylinder body and a rod slidable with respect to the cylinder body; engaging parts that are respectively disposed on the cylinder body and the rod, and are each movable between an engagement position and a release position with extension and contraction of the extensible cylinder, the engaging parts each engaging with a working tool detachably attached to the boom at the engagement position, and not engaging with the working tool at the release position; a cover that covers the extensible cylinder from one direction; and a frame that is fixed to the cover and restricts at least one of: movement of the cylinder body and the rod in an extensible direction exceeding a predetermined position with the extension and contraction of the extensible cylinder, and rotation of the extensible cylinder around an axial direction.

7 Claims, 15 Drawing Sheets

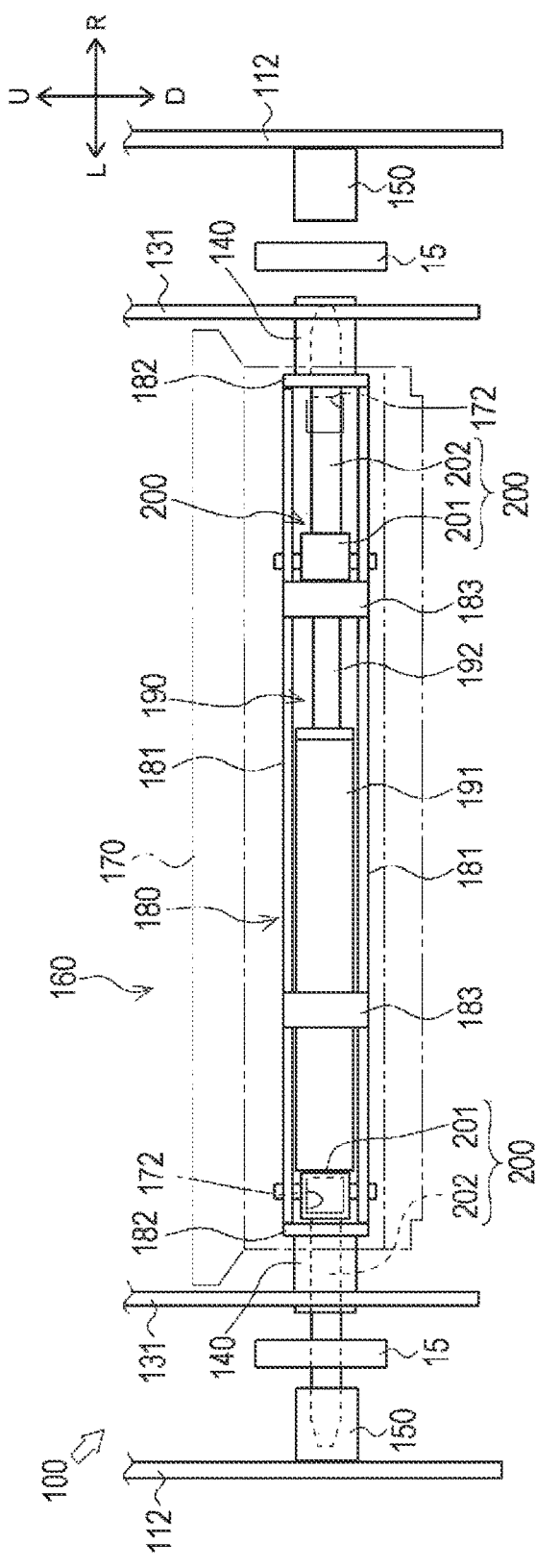
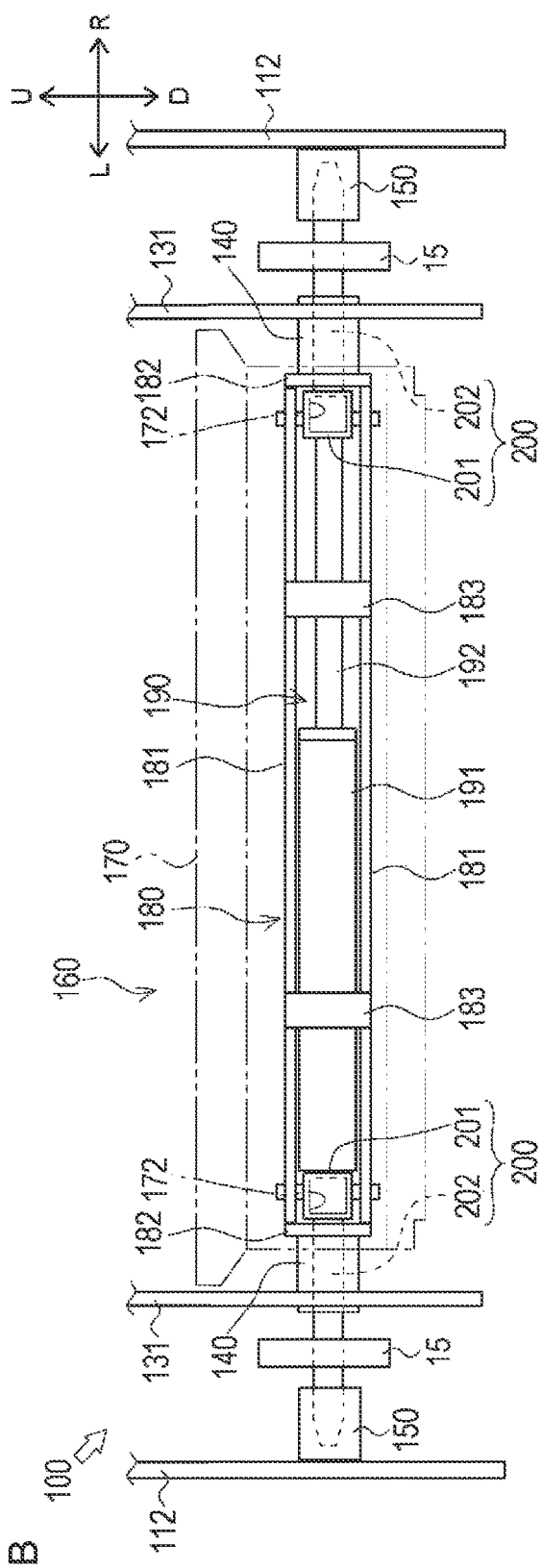
FIG. 13A
FIG. 13B

WORK TOOL MOUNTING MECHANISM

BACKGROUND

Technical Field

The present invention relates to art for a working tool mounting mechanism for mounting a working tool.

Description of Related Art

Conventionally, art for a working tool mounting mechanism for mounting a working tool is widely known. The description in patent literature 1 is an example thereof.

Patent literature 1 discloses a front loader provided with a working tool mounting mechanism for mounting a working tool such as a bucket to the tip end of a boom. Such a working tool mounting mechanism engages or releases the engagement of a lock pin provided on the boom side and the bucket to attach and detach the bucket. Specifically, the working tool mounting mechanism can switch between engaging and releasing the engagement of the lock pin using a rotationally operable lever portion and a link portion for moving the lock pin in accordance with the rotational operation of the lever portion.

In the working tool mounting mechanism described in patent literature 1, the lock pin can be moved using a relatively light operation force due to the link portion. However, when attaching and detaching a bucket using this working tool mounting mechanism, a worker must move to be near the bucket after getting out of the driver's seat to operate the lever portion, and there has been room for improvement relating to workability when attaching and detaching.

Prior-Art Literature

[Patent Literature 1] JP 2020-172796 A

SUMMARY

In light of the above, one or more embodiments of the present invention provide a working tool mounting mechanism that can improve workability.

The working tool mounting mechanism according to one or more embodiments will now be described.

That is, the working tool mounting mechanism for a tractor of one or more embodiments is provided with: an extensible cylinder that can expand and contract, being provided on a tip of a boom of a front loader of the tractor, and provided with a cylinder body and a rod slidable with respect to the cylinder body; engaging parts respectively provided on the cylinder body and the rod, being movable between an engagement position at which the engaging parts each engage with a working tool detachably attached to the boom and a release position at which the engaging parts do not engage with the working tool, with the extension and contraction of the cylinder; a cover that covers the cylinder from one direction; and a restricting portion (i.e., frame) fixed to the cover and restricts at least one of movement of the cylinder body and the rod in the extensible direction exceeding a predetermined position with the extension and contraction of the cylinder, and rotation of the cylinder around an axial direction.

In one or more embodiments, the restricting portion is formed in a frame shape surrounding the cylinder from the extensible direction and a direction perpendicular to the extensible direction.

In one or more embodiments, the engaging parts are provided with linking parts respectively coupled to the cylinder body and the rod; and extending parts extending from the linking parts in the extensible direction of the cylinder; and the restricting portion, by contacting the linking parts, restricts at least one of movement of the cylinder body and the rod in the extensible direction, and rotation of the cylinder around the axial direction.

In one or more embodiments, the working tool mounting mechanism is further provided with fixing portions (i.e., joint rods) that fix the linking parts to the cylinder body or the rod, wherein the restricting portion, by contacting the fixing portion, restricts at least one of the movement of the cylinder body and the rod in the extensible direction or the rotation of the cylinder around the axial direction.

In one or more embodiments, each of the fixing portions passes through one of the linking parts and the cylinder body or the rod, and the restricting portion restricts the rotation of the cylinder around the axial direction by contacting both ends of the fixing portions between which each of the linking parts and the cylinder body or the rod are sandwiched.

In one or more embodiments, the extending parts are at positions each eccentric with respect to an axis of the cylinder.

In one or more embodiments, the cover is provided with an opening through which each of the engaging parts is visible from an exterior.

In one or more embodiments, the opening is formed at a position at which each of the linking parts at the engagement position is visible from the exterior and at which each of the linking parts at the release position is not visible from the exterior.

The following effects are obtained by one or more embodiments of the present invention.

In one or more embodiments, the extension and contraction of the cylinder can be used to attach and detach the working tool, thereby improving workability.

In one or more embodiments, forming the restricting portion in a frame shape makes it possible to improve the strength of the restricting portion.

In one or more embodiments, making the restricting portion and the linking part come into contact makes it possible to restrict the movement or rotation of the cylinder.

In one or more embodiments, making the restricting portion and the fixing portion come into contact makes it possible to restrict the movement or rotation of the cylinder.

In one or more embodiments, making the restricting portion come into contact with both ends of the fixing portion makes it possible to restrict rotation of the cylinder in a stable manner.

In one or more embodiments, making the extending part and the cylinder relatively eccentric allows freedom in design to be improved such as in preventing interference with other members.

In one or more embodiments, the position of the engaging part can be visually recognizable via the opening, so the current state of the engaging part (whether it is positioned in the engagement position or the release position) can be easily understood.

In one or more embodiments, whether the linking part can be visually recognizable via the opening is confirmed, so the state of the engaging part (whether it is positioned in the engagement position or the release position) can be easily understood.

BRIEF DESCRIPTION OF DRAWINGS

FIG. 13A is a schematic rear view illustrating a state wherein the engaging part on the left side is moved to an engaging position, and FIG. 13B is a schematic rear view illustrating a state wherein the engaging part on the right side is moved to an engaging position.

DETAILED DESCRIPTION OF EMBODIMENTS

Figure 1:
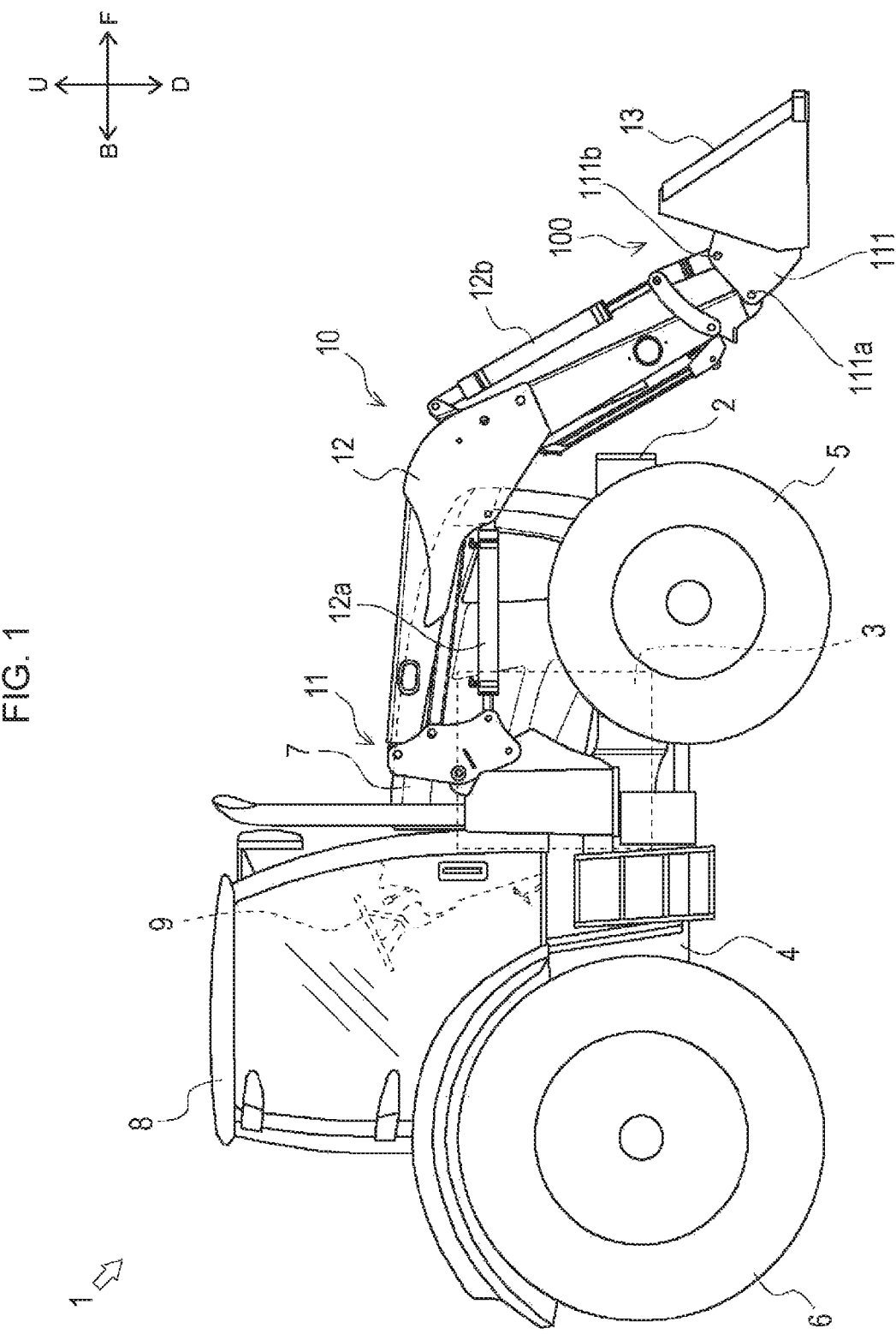
FIG. 1 is a side view illustrating an overall configuration of a tractor according to one or more embodiments of the present invention.

Below, a description is given having the directions illustrated in the drawings using arrow U, arrow D, arrow F, arrow B, arrow L, and arrow R respectively defined as the up direction, down direction, front direction, back direction, left direction, and right direction.

A description will be given of an overall configuration of a tractor 1 provided with a working tool mounting mechanism 100 according to one or more embodiments of the present invention.

The tractor 1 is mainly provided with a body frame 2, an engine 3, a transmission case 4, a front wheel 5, a back wheel 6, a bonnet 7, a cabin 8, a steering wheel 9, and a front loader 10.

The fuselage frame 2 is a frame-shaped member formed by appropriately combining a plurality of plates. The fuselage frame 2 is formed in a substantially rectangular shape in a planar view. The fuselage frame 2 is disposed such that its long side is substantially parallel to the front and back direction. The engine 3 is fixed on the back portion of the fuselage frame 2. The transmission case 4 is fixed on the back portion of the engine 3. The front portion of the fuselage frame 2 is supported by a pair of left and right front wheels 5 via a front axle mechanism (not illustrated in drawings). The back portion of the transmission case 4 is supported by a pair of left and right back wheels 6 via a rear axle mechanism (not illustrated in drawings). The engine 3 is covered by the bonnet 7.

After shifting using a transmission device (not illustrated in drawings) stored in the transmission case 4, the power of the engine 3 can be transmitted to the front wheels 5 via the front axle mechanism and can be transmitted to the back wheels 6 via the rear axle mechanism. The front wheels 5 and the back wheels 6 are rotationally driven by the power of the engine 3, enabling the tractor 1 to run.

The cabin 8 is provided behind the engine 3. A housing space for a worker to board is formed in the cabin 8. A steering wheel 9 for adjusting the steering angle of the front wheels 5 and a seat or the like for seating various operating tools and workers are disposed in this housing space.

The front loader 10 is mounted on the front portion of the tractor 1. The front loader 10 is mainly provided with a pair of left and right frames 11, a pair of left and right booms 12, a bucket 13, and a working tool mounting mechanism 100.

The frames 11 are respectively fixed to the left and right of the chassis (fuselage frame 2 and transmission case 4) of the tractor 1. The booms 12 are rotatably fixed on the upper portions of the frames 11 respectively. The booms 12 are disposed to extend downward and forward from the upper portions of the frames 11. The bucket 13 is detachably linked to the front end of the booms 12 via the working tool mounting mechanism 100. The working tool mounting mechanism 100 is rotatably provided on the front end of the booms 12. Note that a detailed description of the working tool mounting mechanism 100 will be given hereafter.

Figure 2:
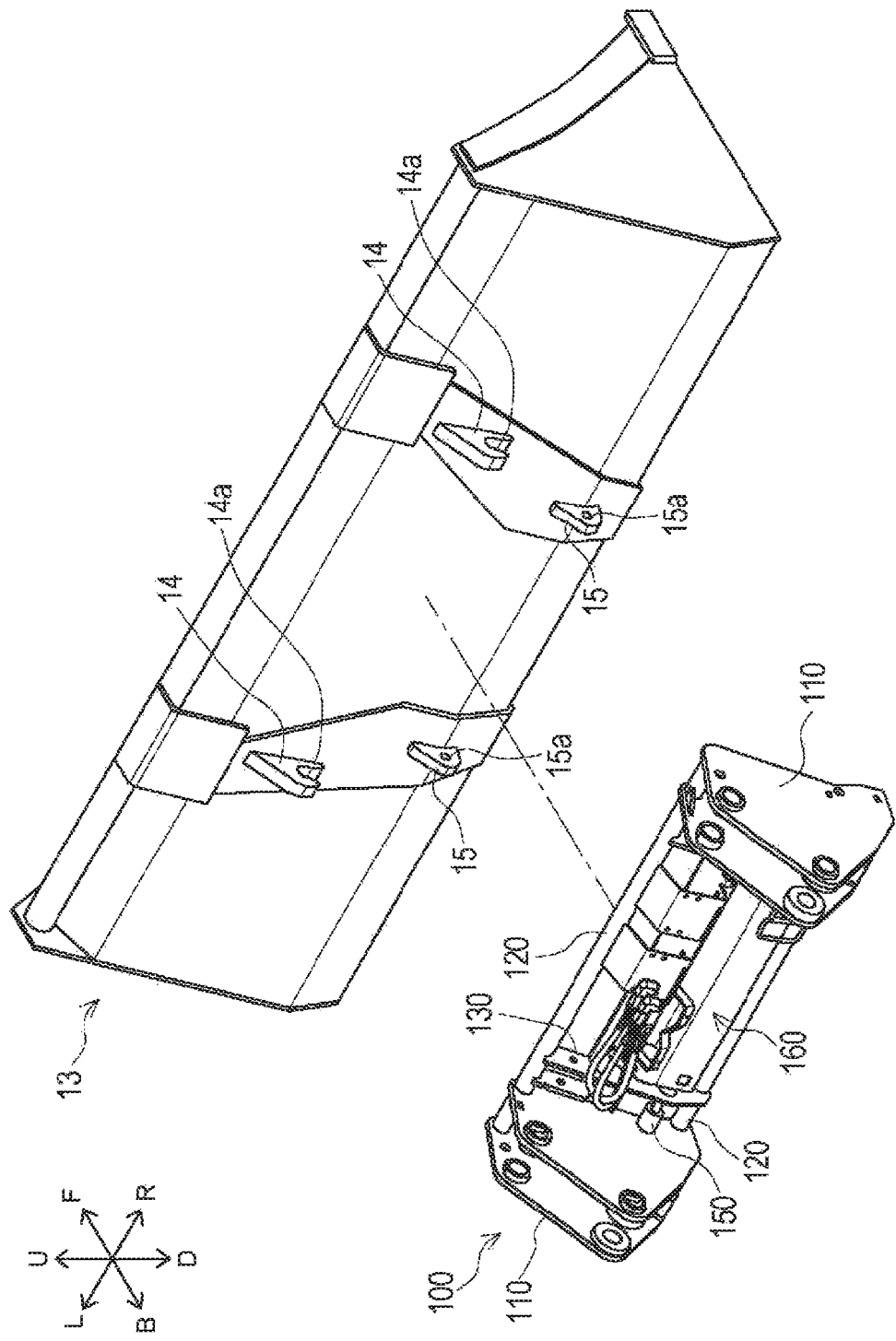
FIG. 2 is a perspective view illustrating a configuration of a working tool mounting mechanism and a bucket.

The booms 12 can be rotated with respect to the frames 11 by expanding and contracting a boom cylinder 12a. The bucket 13 can be rotated with respect to the booms 12 by expanding and contracting a bucket cylinder 12b. In this manner, it is possible to carry out work such as transporting earth and sand while appropriately rotating the booms 12 and the bucket 13. The bucket 13 has a shape that opens forward. As illustrated in FIG. 2, the bucket 13 is provided with an upper engaged portion 14 and a lower engaged portion 15.

The upper engaged portion 14 is a portion provided on the upper portion on the back surface of the bucket 13. Two upper engaged portions 14 are provided on the left and right with a gap therebetween. A concave portion 14a that can latch onto a linking shaft portion 120 of the working tool mounting mechanism 100 described hereafter is formed on the upper engaged portion 14.

The lower engaged portion 15 is a portion provided on the lower portion on the back surface of the bucket 13. Two lower engaged portions 15 are provided on the left and right with a gap therebetween. The lower engaged portions 15 are formed in a substantial plate shape with the plate surface thereof oriented in the left and right direction. A through-hole 15a that is substantially circular in a side view and passes through in the left and right direction is formed on the lower engaged portion 15.

Details of the working tool mounting mechanism 100 will be described below using FIG. 2 to FIG. 11.

Figure 3:
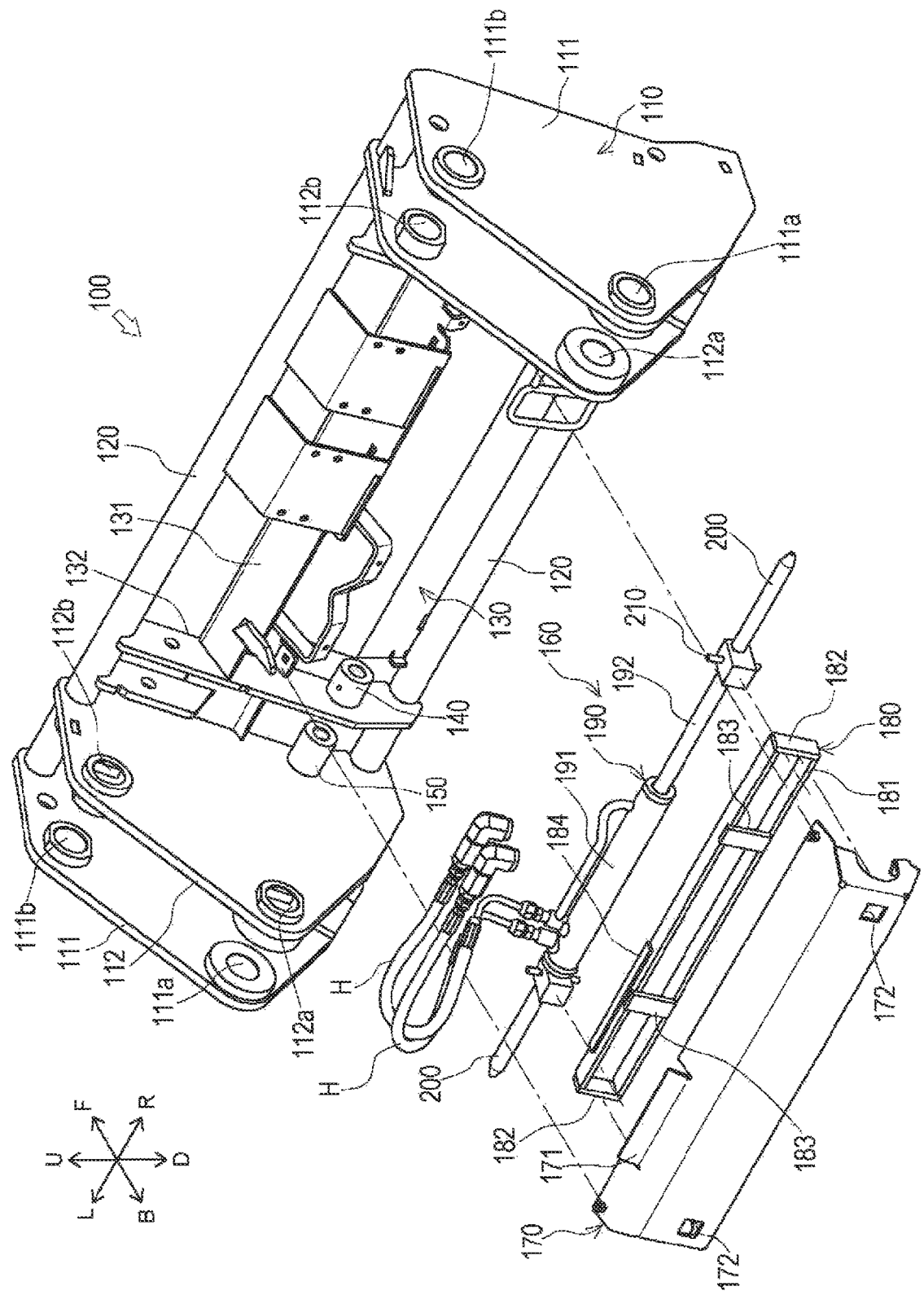
FIG. 3 is an exploded perspective view illustrating a working tool mounting mechanism.
Figure 4:
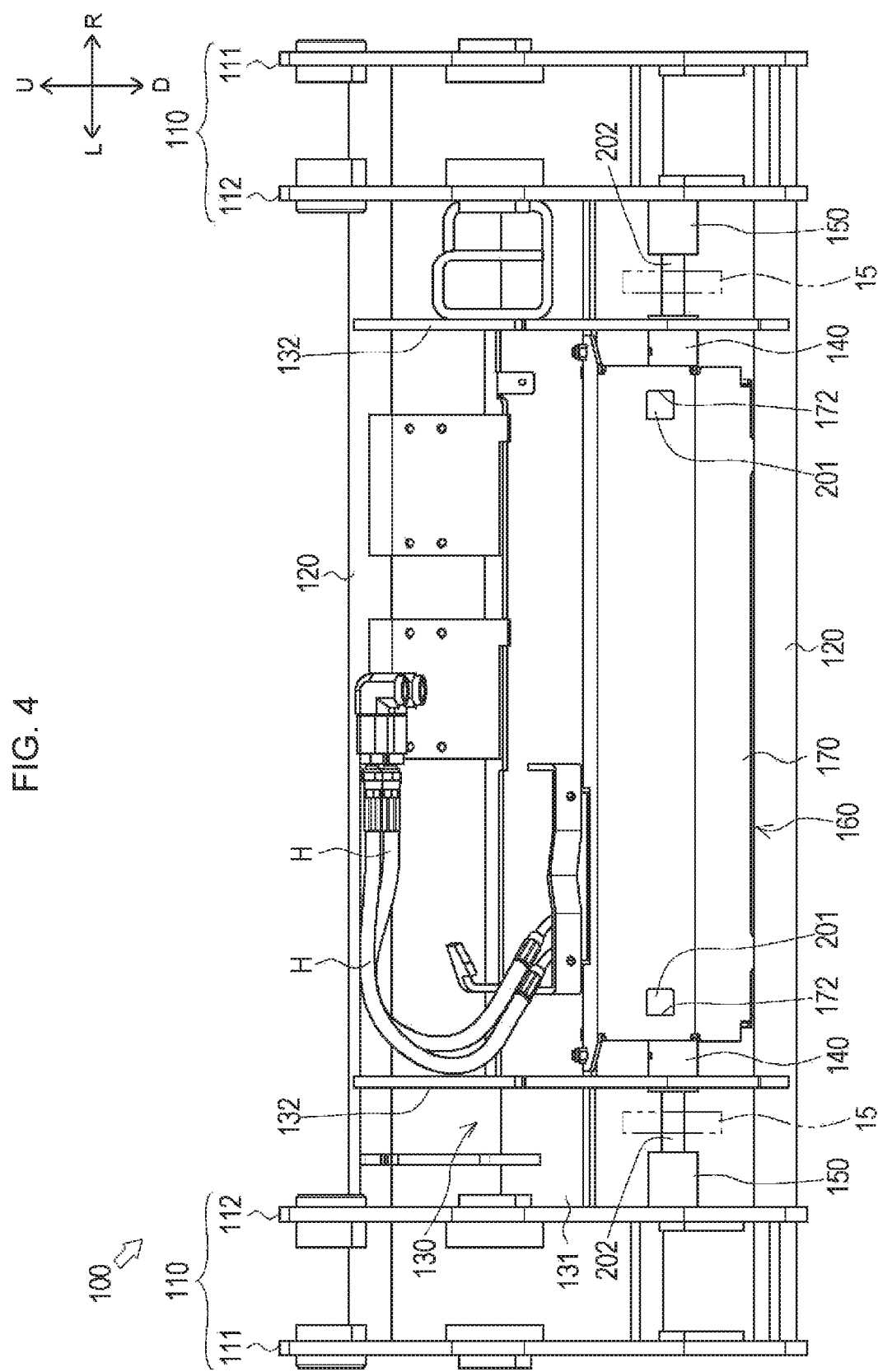
FIG. 4 is a rear view of the above.

The working tool mounting mechanism 100 has the bucket 13 detachably mounted thereto. The front end of the pair of booms 12 is linked to the working tool mounting mechanism 100 (see FIG. 1). As illustrated in FIG. 2 to FIG. 4, the working tool mounting mechanism 100 is provided with an attachment portion 110, a linking shaft portion 120, a support plate portion 130, a guide portion 140, a boss portion 150, and a switching portion 160.

The attachment portion 110 is a portion to which the booms 12 and the bucket cylinder 12b are attached. The attachment portion 110 is respectively provided on the left end and the right end of the working tool mounting mechanism 100. The attachment portion 110 is provided with an outer plate portion 111 and an inner plate portion 112. An example is given below of the left side attachment portion 110, and the configuration of the outer plate portion 111 and the inner plate portion 112 are described below.

As illustrated in FIG. 3 and FIG. 4, the outer plate portion 111 and the inner plate portion 112 are formed in a substantial plate shape with the plate surface thereof oriented in the left and right direction. The inner plate portion 112 is disposed to the right of the outer plate portion 111 with a gap therebetween. The tips of the booms 12 and the bucket cylinder 12b are disposed between the outer plate portion 111 and the inner plate portion 112 (not illustrated in the drawings). As illustrated in FIG. 3, the outer plate portion 111 and the inner plate portion 112 are provided with boom linking holes 111a and 112a and cylinder linking holes 111b and 112b.

The boom linking holes 111a and 112a are holes that pass through the outer plate portion 111 and the inner plate portion 112 in the left and right direction. The boom linking holes 111a and 112a are formed on the lower back portion of the outer plate portion 111 and the inner plate portion 112. A predetermined linking shaft provided on the booms 12 is inserted into the boom linking holes 111a and 112a (not illustrated in the drawings). The outer plate portion 111 and the inner plate portion 112 are linked to the tip of the booms 12 via the linking shaft.

The cylinder linking holes 111b and 112b are holes that pass through the outer plate portion 111 and the inner plate portion 112 in the left and right direction. The cylinder linking holes 111b and 112b are formed on the upper portion of the outer plate portion 111 and the inner plate portion 112. A predetermined linking shaft provided on the bucket cylinder 12b is inserted into the cylinder linking holes 111b and 112b (not illustrated in the drawings). The outer plate portion 111 and the inner plate portion 112 are linked to the tip of the bucket cylinder 12b via the linking shaft.

The linking shaft portion 120 illustrated in FIG. 2 to FIG. 4 links the left and right attachment portions 110. The linking shaft portion 120 is disposed having the axial direction oriented in the left and right direction. Two upper and lower linking shaft portions 120 are disposed with a gap therebetween. The upper and lower linking shaft portions 120 are provided so as to extend from the left attachment portion 110 to the right attachment portion 110. The concave portion 14a of the upper engaged portion 14 of the bucket 13 latches onto the upper linking shaft portion 120 when the bucket 13 is mounted to the working tool mounting mechanism 100.

The support plate portion 130 is a portion for supporting the guide portion 140 and the switching portion 160 described hereafter. The support plate portion 130 is formed by combining a plurality of plate-shaped members. As illustrated in FIG. 3 and FIG. 4, a first plate portion 131 and a second plate portion 132 are included in the support plate portion 130.

The first plate portion 131 is a portion for supporting the switching portion 160. The first plate portion 131 is formed to extend from the left inner plate portion 112 to the right inner plate portion 112.

The second plate portion 132 is a portion for supporting the guide portion 140. The second plate portion 132 is disposed having the plate surface substantially oriented in the left and right direction, and is formed to extend from the upper linking shaft portion 120 to the lower linking shaft portion 120. The second plate portion 132 is provided in a left and right pair.

The guide portion 140 is a portion for guiding the movement of a lock pin 202 described hereafter. The guide portion 140 is formed in a substantially cylindrical shape having the axial direction oriented in the left and right direction. The guide portion 140 is provided in a left and right pair. The left and right guide portions 140 are supported by the left and right second plate portions 132.

The boss portion 150 is a portion that engages with the lock pin 202. The boss portion 150 is formed in a substantially cylindrical shape having the axial direction oriented in the left and right direction. The boss portion 150 is provided in a left and right pair. The left and right boss portions 150 are fixed to the front lower portions on the left and right inner plate portions 112. The left and right boss portions 150 are disposed coaxially with the guide portion 140.

Figure 5:
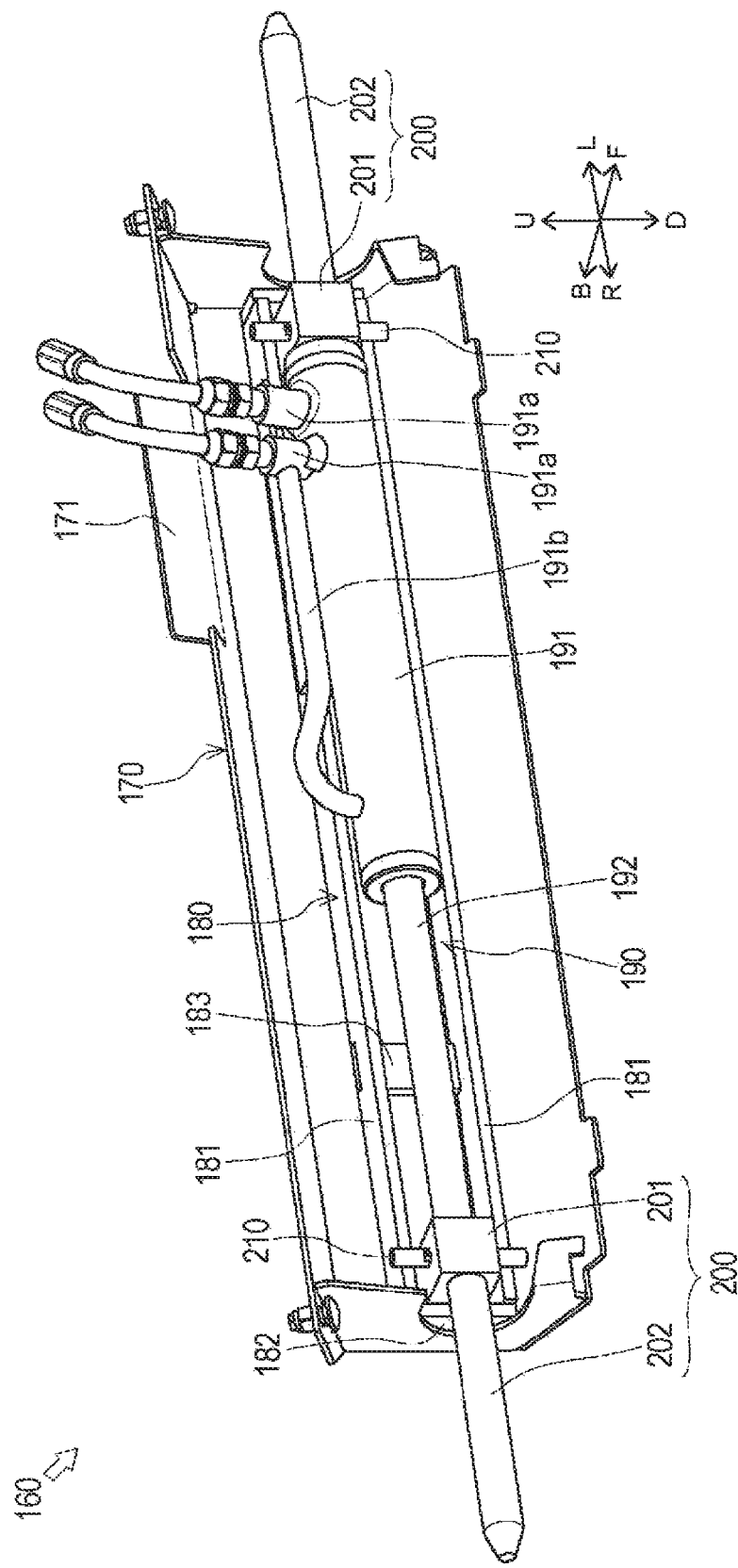
FIG. 5 is a perspective view illustrating a switching portion.
Figure 6:
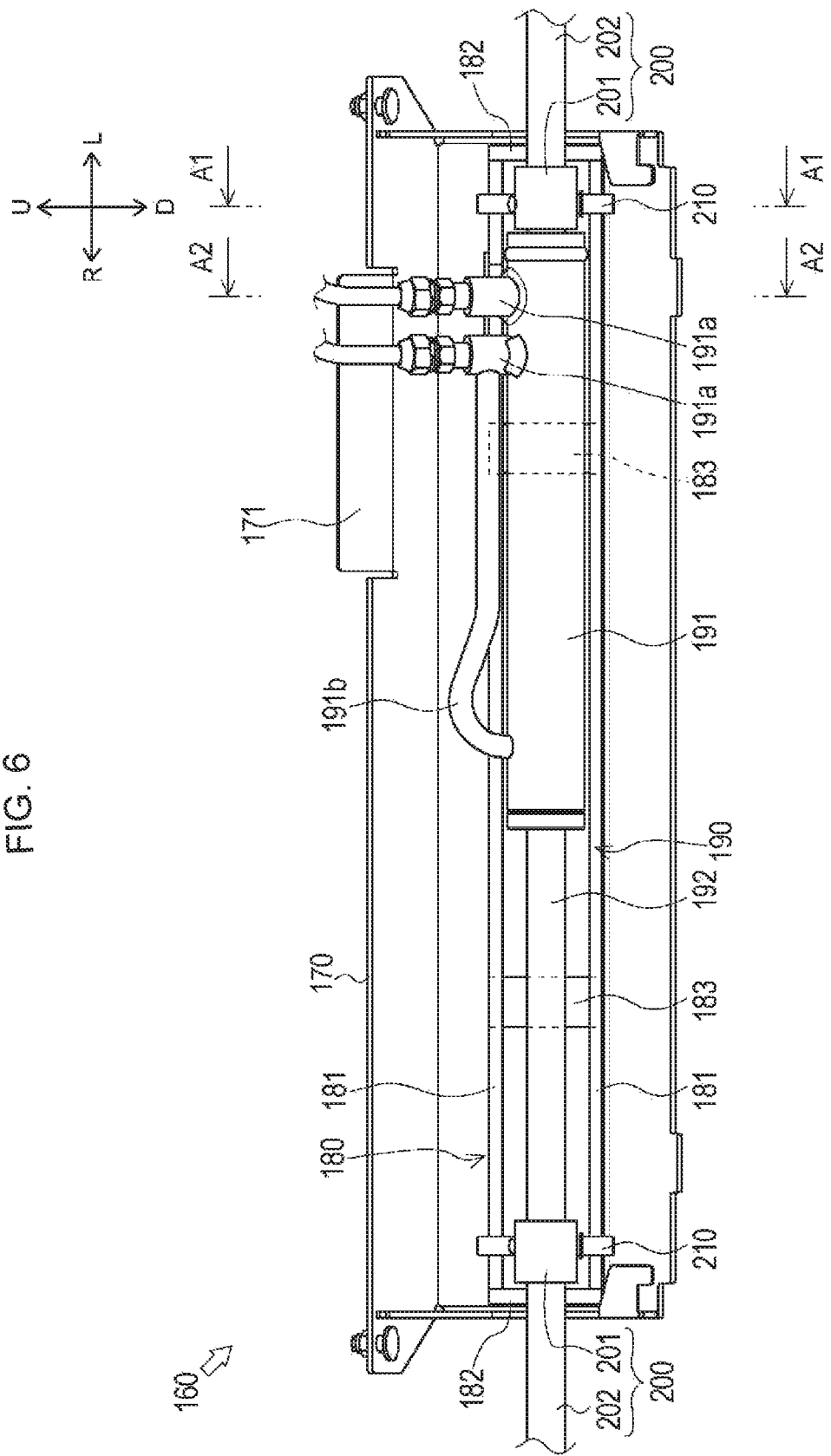
FIG. 6 is a front view of the above.

The switching portion 160 is a portion for switching between a state wherein the bucket 13 can be removed from the working tool mounting mechanism 100 and a state wherein it cannot be removed. The switching portion 160 is supported by the support plate portion 130 and is disposed between the left and right second plate portions 132. As illustrated in FIG. 3, FIG. 5, and FIG. 6, the switching portion 160 is provided with a cover 170, a frame 180, a cylinder 190, an engaging part 200, and a joint rod 210.

The cover 170 configures the outline of the switching portion 160. The cover 170 is formed in a substantial box shape having an open front portion. The cover 170 is provided to cover the frame 180 and the cylinder 190, described hereafter, from behind. Furthermore, the cover 170 is attached to the first plate portion 131 from behind. The cover 170 has a bent portion 171 and an opening 172.

The bent portion 171 is a portion formed to bend upward. The bent portion 171 is formed in the left front portion on the upper portion of the cover 170. In this manner, the cover 170 is formed having a portion of the upper surface (left front portion) open due to the bent portion 171, and is formed so that a member (hose H or piping) in which hydraulic fluid of the cylinder 190 described hereafter flows can be guided inwards.

The opening 172 illustrated in FIG. 3 and FIG. 4 is a portion open to the exterior, and the opening 172 is formed respectively on the left end and the right end on the back portion (surface oriented to the rear) of the cover 170. The left and right openings 172 are formed to pass through the cover 170 forward and backward. The left and right openings 172 are formed in a substantially rectangular shape when viewed from the rear.

The frame 180 illustrated in FIG. 3, FIG. 5, and FIG. 6 is for restricting the movement of the cylinder 190. The frame 180 is provided with a horizontal member 181, a vertical member 182, an intermediate member 183, and an auxiliary member 184.

Figure 7:
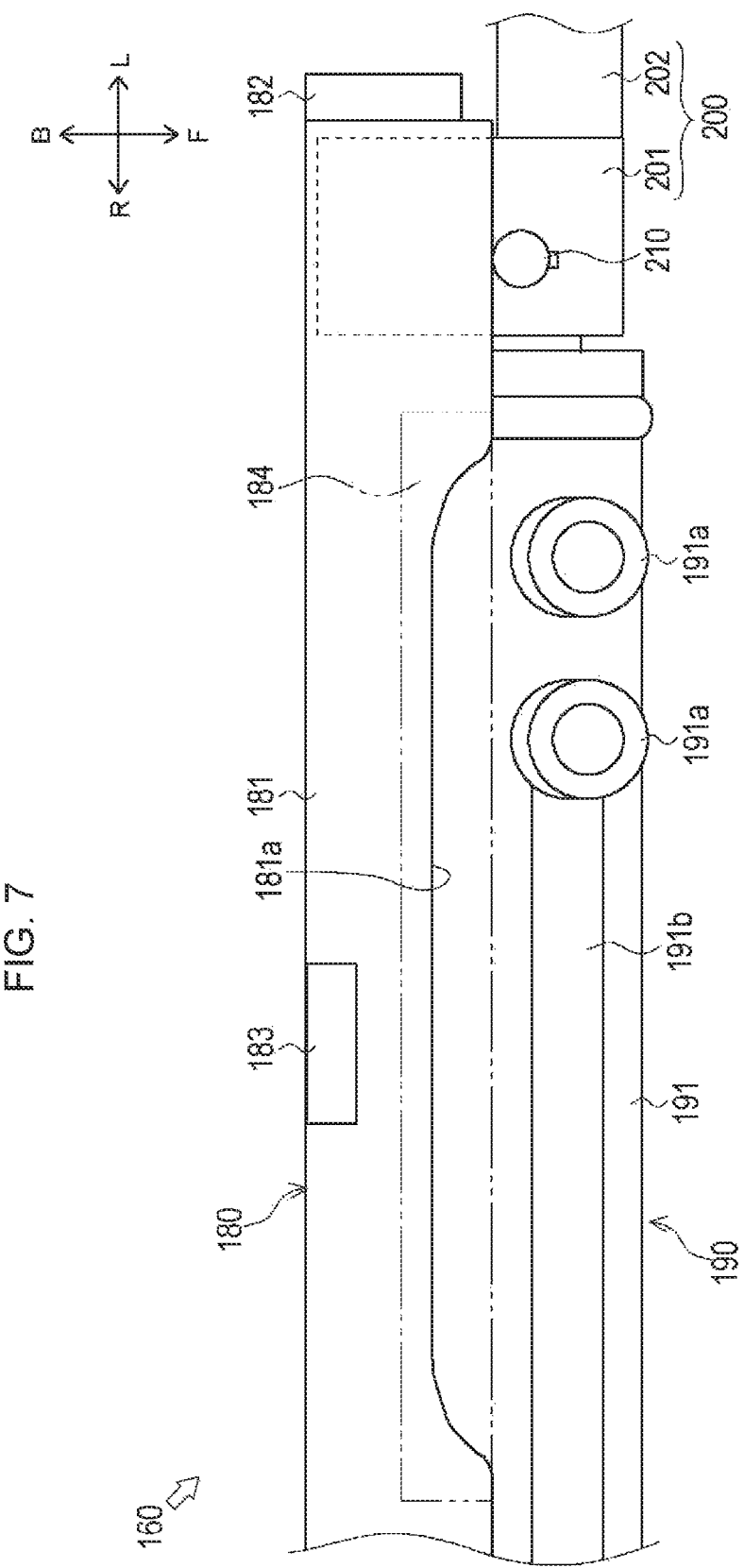
FIG. 7 is a planar view illustrating a notch portion.
Figure 9:
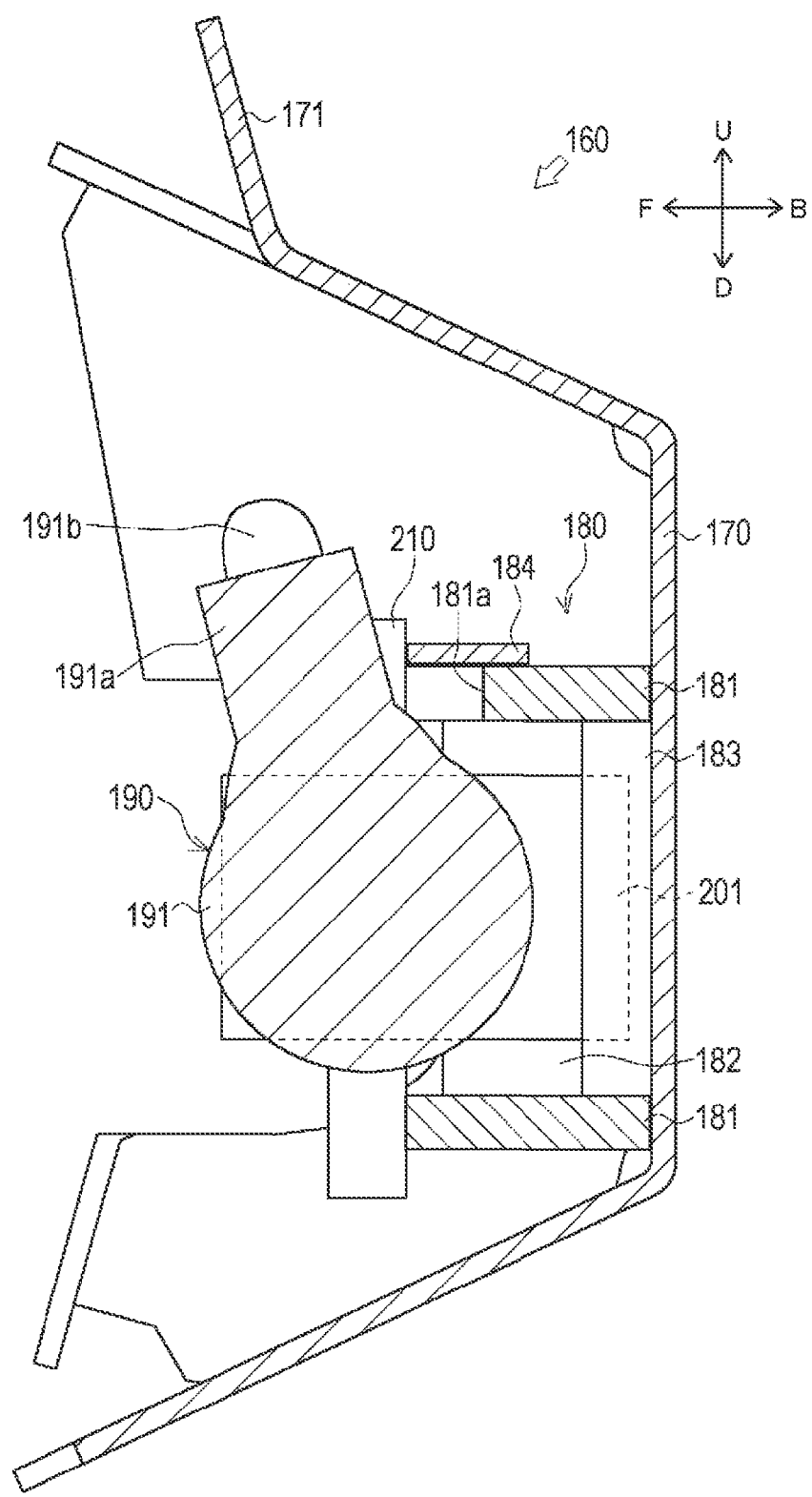
FIG. 9 is a cross-sectional view on A2-A2.

The horizontal member 181 is a plate-shaped member disposed such that its long side is substantially parallel to the left and right direction. The horizontal member 181 is disposed having the plate surface oriented in the up and down direction. Furthermore, two upper and lower horizontal members 181 are disposed with a gap therebetween. As illustrated in FIG. 7 and FIG. 9, the upper horizontal member 181 has a notch portion 181a.

The notch portion 181a is formed by notching the front end of the horizontal member 181. The notch portion 181a is formed on the left portion of the horizontal member 181 (below the auxiliary member 184 described hereafter). The notch portion 181a is formed behind and below the bent portion 171 (see FIG. 5). The width of the notch portion 181a in the left and right direction is formed to be approximately the same as the width of the bent portion 171 in the left and right direction.

As illustrated in FIG. 3 and FIG. 6, the vertical member 182 is a plate-shaped member disposed such that its long side is substantially parallel to the up and down direction. The vertical member 182 is disposed such that the plate surface faces toward the left and right direction. A pair of left and right vertical members 182 is provided so as to respectively connect the left end and right end of the upper and lower horizontal members 181. In this manner, the frame 180 is formed in a rectangular frame shape by the horizontal member 181 and the vertical member 182 when viewed from the front and is disposed such that its long side is substantially parallel to the left and right direction.

The intermediate member 183 is a plate-shaped member attached to the left and right intermediate portions of the horizontal member 181. The intermediate member 183 is disposed such that the plate surface faces toward the substantial front and back direction. The intermediate member 183 is provided so as to extend from the upper horizontal member 181 to the lower horizontal member 181. Two left and right intermediate members 183 are disposed with a gap therebetween.

The auxiliary member 184 illustrated in FIG. 3, FIG. 7, and FIG. 9 is a plate-shaped member that can abut a joint rod 210. An abutting member is disposed such that its long side is substantially parallel to the left and right direction, and is provided to cover the notch portion 181a of the horizontal member 181 from above. The auxiliary member 184 is disposed such that the front and back position of the front end is located at substantially the same position as the front end of the horizontal member 181.

The frame 180 configured as described above is disposed inside the cover 170 and fixed to the inner surface (back surface) of the cover 170. In this manner, the frame 180 (horizontal member 181) is provided to extend from the left end to the right end of the cover 170. By the frame 180 being fixed to the cover 170 in this manner, the frame 180 and the cover 170 can be handled integrally, so the worker can easily assemble and perform maintenance on the switching portion 160.

The cylinder 190 illustrated in FIG. 5 and FIG. 6 moves the engaging part 200 described hereafter in the left and right direction. The cylinder 190 is disposed inside the frame 180. In this manner, the cylinder 190 is surrounded by the frame 180 from four directions in the left and right direction (extensible direction of a rod 192 described hereafter) and the up and down direction (direction perpendicular to the extensible direction of the rod 192). The cylinder 190 is configured by a hydraulic cylinder. The cylinder 190 is provided with a cylinder body 191 and the rod 192.

The cylinder body 191 is disposed having the axial direction oriented in the left and right direction. The cylinder body 191 is disposed inside the frame 180. The cylinder body 191 is provided with a port 191a, a pipe 191b and a protrusion 191c (see FIG. 10).

The port 191a is a portion for connecting the hose H (see FIG. 4) through which hydraulic oil is circulated. Two ports 191a are provided on the left and right with a gap therebetween. The left and right ports 191a are collectively disposed on the left end of the cylinder body 191. As illustrated in FIG. 5 and FIG. 9, the left and right ports 191a extend forward and upward from the outer peripheral surface of the cylinder body 191. Furthermore, the left and right ports 191a are disposed in front of the notch portion 181a. In this manner, the port 191a is provided so as not to interfere with the horizontal member 181.

The pipe 191b is for guiding hydraulic oil from the right port 191a to the right portion of the cylinder body 191.

Figure 10:
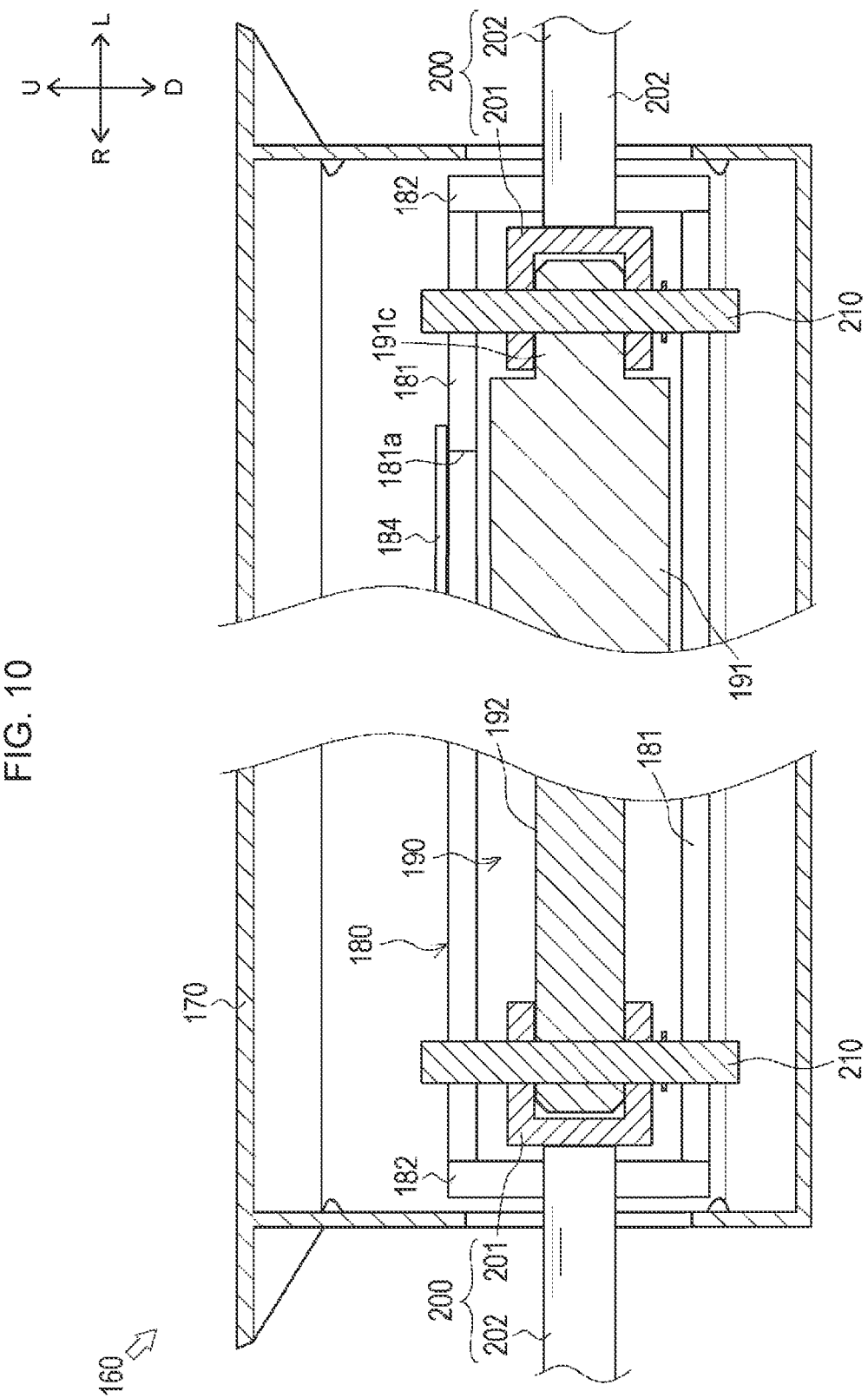
FIG. 10 is a front cross-sectional view illustrating a switching portion.

The protrusion 191c illustrated in FIG. 10 is a portion that protrudes from the cylinder body 191 to the left. The protrusion 191c is formed at the bottom portion (left end) of the cylinder body 191.

The rod 192 illustrated in FIG. 5 and FIG. 6 is provided to protrude from the cylinder body 191 to the right. The rod 192 can slide in the left and right direction with respect to the cylinder body 191 due to hydraulic pressure.

Figure 11:
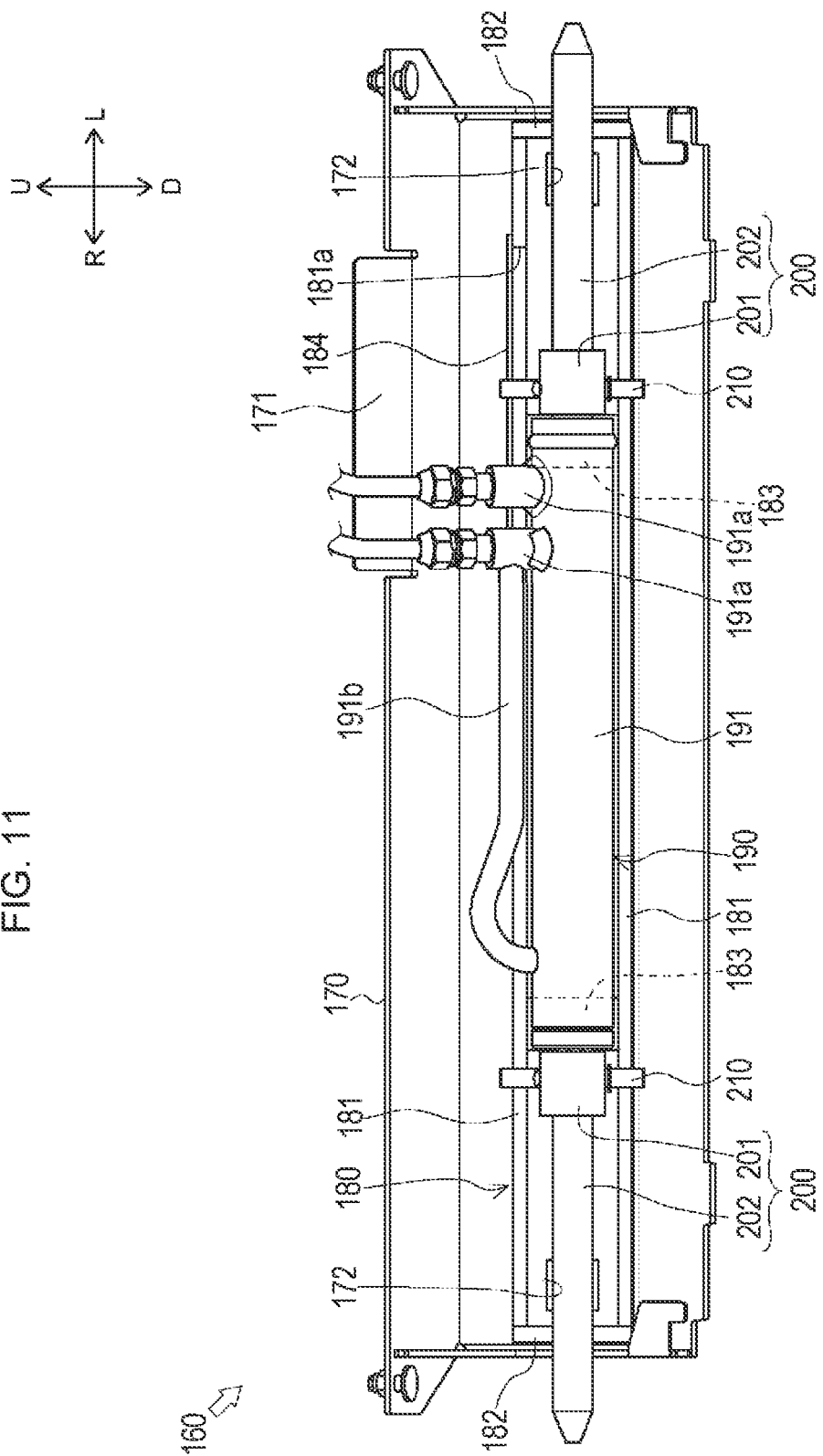
FIG. 11 is a front view illustrating a switching portion wherein a cylinder is contracted.

The cylinder 190 configured as described above is supported by the guide portion 140 to be capable of movement in the left and right direction via the engaging part 200 described hereafter. Furthermore, the cylinder 190 can expand and contract according to the operation of an operating tool provided inside the cabin 8 (see FIG. 1). FIG. 2 to FIG. 10 illustrate the switching portion 160 having the cylinder 190 expanded. Furthermore, FIG. 11 illustrates the switching portion 160 when the cylinder 190 is contracted.

The engaging part 200 is a member that integrally moves with the cylinder 190 according to the extension and contraction of the cylinder 190. As illustrated in FIG. 10, the engaging part 200 is respectively provided on the protrusion 191c and the rod 192 of the cylinder body 191. In this manner, a left and right pair of the engaging parts 200 is provided interposing the cylinder 190. First, the configuration of the left engaging part 200 will be described below. The left engaging part 200 is provided with a linking part 201 and a lock pin 202.

Figure 8:
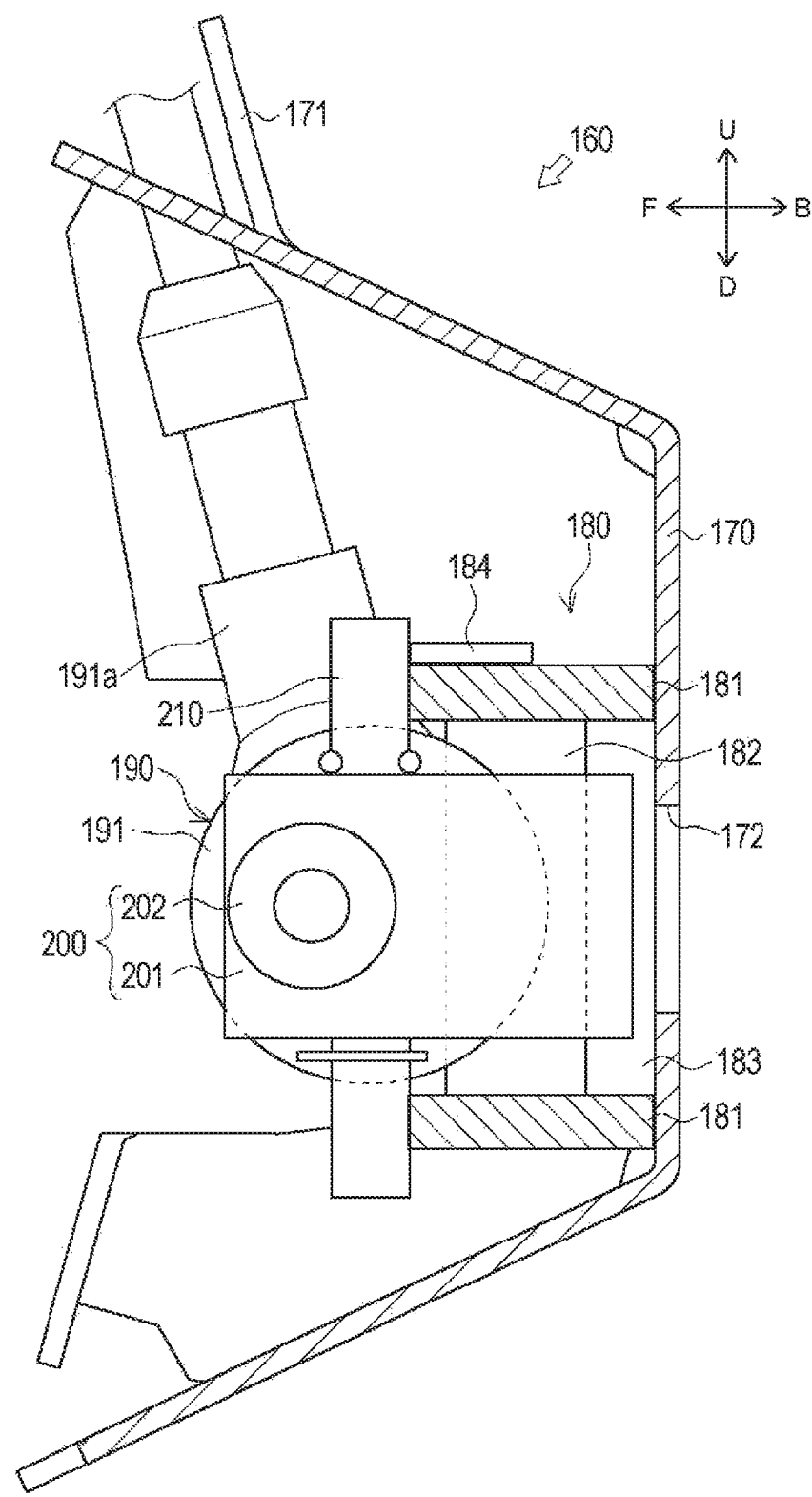
FIG. 8 is a partial cross-sectional view on A1-A1.

As illustrated in FIG. 5, FIG. 6, and FIG. 8, the linking part 201 is a member having a substantially rectangular parallelepiped shape. The linking part 201 is formed in a substantially rectangular shape in a side view and is disposed such that its long side is substantially parallel to the front and back direction. The rear surface (back surface) of the linking part 201 is formed to be slightly larger than the opening 172 of the cover 170 (see FIG. 12). Furthermore, a label of a color that is easy to recognize by a worker (for example, a color that has a high contrast with the color of the back surface of the cover 170 and the rod 192 of the cylinder 190) is adhered to the back surface of the linking part 201. As illustrated in FIG. 10, the protrusion 191c of the cylinder body 191 is inserted into the linking part 201. As described hereafter, the linking part 201 is connected to the protrusion 191c via a joint rod 210.

As illustrated in FIG. 7 and FIG. 8, the back portion of the linking part 201 is disposed in the frame 180. More specifically, the back portion of the linking part 201 is disposed between the left vertical member 182 and the left intermediate member 183, and is disposed to overlap with the vertical member 182 and the intermediate member 183 in a side view. Furthermore, the linking part 201 is disposed according to the position in the height direction with respect to the opening 172 of the cover 170.

The lock pin 202 is a member that can be inserted into the boss portion 150 (see FIGS. 13A-13B). As illustrated in FIG. 5 and FIG. 6, the lock pin 202 is formed in a cylindrical shape having the axial direction oriented in the left and right direction. The left end of the lock pin 202 is formed in a tapered shape so that its diameter decreases toward the left. The lock pin 202 is fixed to the left side surface of the linking part 201 and is provided so as to protrude to the left from the linking part 201. In this manner, the lock pin 202 extends from the linking part 201 in the extensible direction (left and right direction) of the cylinder 190. The lock pin 202 is disposed eccentrically with respect to the axis of the cylinder 190 as illustrated in FIG. 8. More specifically, the lock pin 202 is disposed at a position displaced to the front with respect to the axis of the cylinder 190.

Moreover, the lock pin 202 is disposed coaxially with the guide portion 140 and the boss portion 150 illustrated in FIG. 3 and FIG. 4. Furthermore, the lock pin 202 is inserted into the left guide portion 140 and supported by the guide portion 140.

Next, the configuration of the right engaging part 200 will be described. The right engaging part 200 is formed in left and right symmetry with respect to the left engaging part 200. The tip of the rod 192 is inserted into the right linking part 201. Furthermore, the right lock pin 202 is supported by the right guide portion 140. In this manner, in one or more embodiments, the cylinder 190 is supported by the guide portion 140 via the left and right lock pins 202, and the cylinder 190 is provided to be able to move in the left and right direction within the frame 180.

The joint rod 210 illustrated in FIG. 8 and FIG. 10 is for fixing the linking part 201. The joint rod 210 is respectively provided on the left and right linking parts 201. The left joint rod 210 is disposed to pass through the left linking part 201 and the protrusion 191c of the cylinder body 191 vertically. Thus, the left joint rod 210 fixes the cylinder body 191 and the left linking part 201. Moreover, the right joint rod 210 is disposed to pass through the right linking part 201 and the tip of the rod 192 vertically. Thus, the right joint rod 210 fixes the rod 192 and the right linking part 201.

Moreover, the upper portion of the joint rod 210 (portion protruding upward from the linking part 201) abuts the upper horizontal member 181 of the frame 180. Moreover, the lower portion of the joint rod 210 (portion protruding downward from the linking part 201) abuts the lower horizontal member 181 of the frame 180. Thus, the frame 180 can restrict the rotation around the axis of the cylinder 190.

Figure 12:
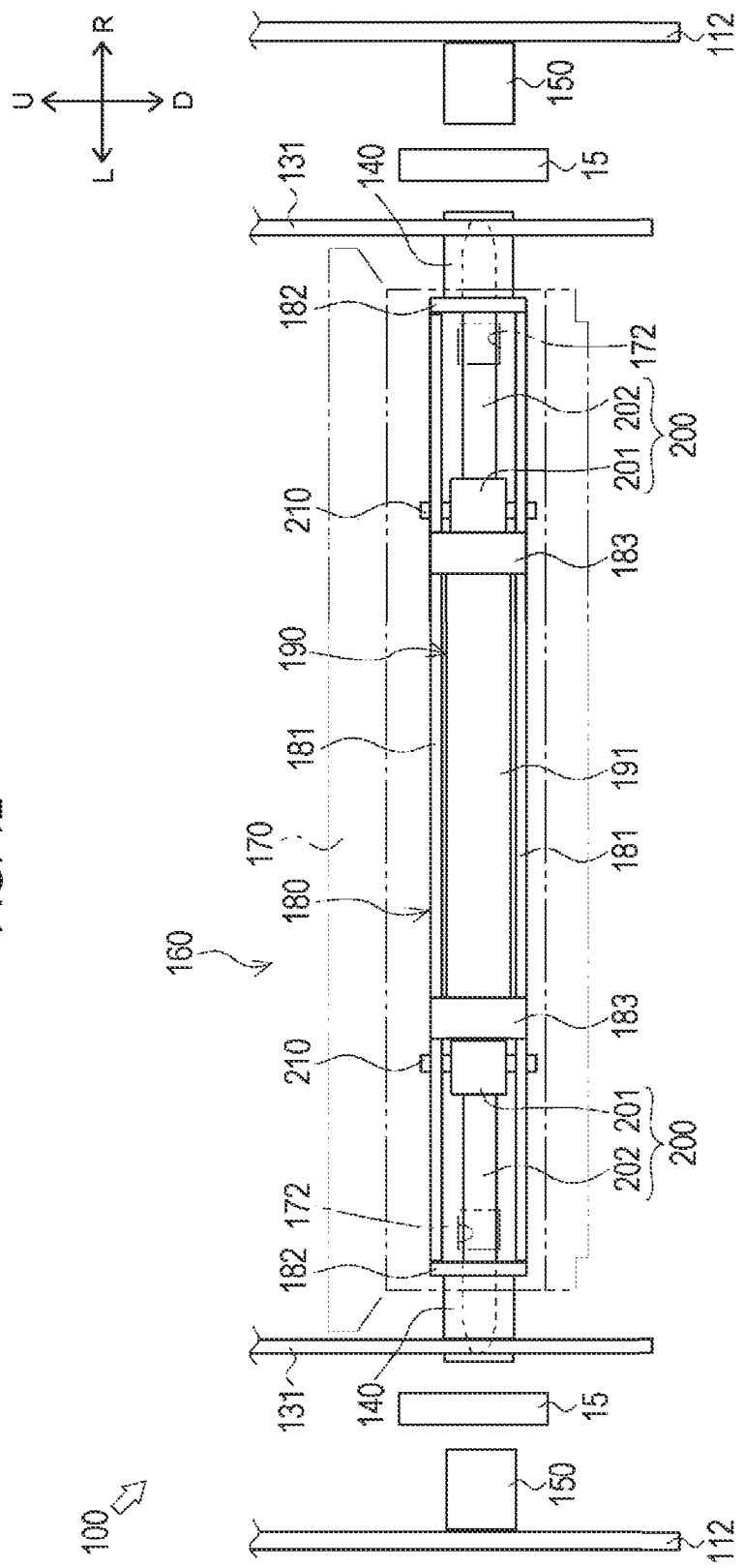
FIG. 12 is a schematic rear view of the above.

Next, the operation of the working tool mounting mechanism 100 configured as described above will be described with reference to FIG. 1, FIG. 2, FIG. 12, and FIGS. 13A-13B. Note that FIG. 12 and FIGS. 13A-13B are schematic rear views illustrating the switching portion 160 and the peripheral members thereof (guide portion 140 and the like). The operation of the working tool mounting mechanism 100 will be described below by giving an example wherein the bucket 13 is mounted. Furthermore, the cylinder 190 of the working tool mounting mechanism 100 is contracted before the operation is started, as illustrated in FIG. 12.

When mounting the bucket 13, a worker causes the boom cylinder 12a and the bucket cylinder 12b illustrated in FIG. 1 to contract, moves the working tool mounting mechanism 100, and latches the upper linking shaft portion 120 illustrated in FIG. 2 on the upper engaged portion 14 (concave portion 14a) of the bucket 13. Furthermore, as illustrated in FIG. 12, the worker disposes the guide portion 140 and the boss portion 150 coaxially with the lower engaged portion 15 (through-hole 15a) of the bucket 13. At this time, the lock pin 202 is disposed on the left and right inner sides of the lower engaged portion 15.

The worker causes the cylinder 190 to extend as illustrated in FIG. 12. Thus, either the cylinder body 191 or the rod 192, depending on which has smaller sliding resistance with the lock pin 202, moves before the other. For example, as illustrated in FIG. 13A, when the sliding resistance of the left lock pin 202 is small, the cylinder body 191 moves first. At this time, the cylinder body 191 moves to the left, and the left engaging part 200 moves to the left along with this movement.

Thus, the lock pin 202 is inserted into the lower engaged portion 15 of the bucket 13 and is inserted into the boss portion 150. In this manner, the left engaging part 200 is moved to an engaging position where it can engage with the bucket 13. When the cylinder 190 is further expanded from this state, the linking part 201 approaches the left vertical member 182 and abuts the left vertical member 182. Thus, the frame 180 restricts the movement of the cylinder body 191 and the left engaging part 200.

Furthermore, when the cylinder 190 is further expanded while the movement of the left engaging part 200 is restricted, as illustrated in FIG. 13B, the right engaging part 200 (engaging part 200 having the larger sliding resistance) moves to the right. Accordingly, the lock pin 202 is inserted into the lower engaged portion 15 and is inserted into the boss portion 150. In this manner, the right engaging part 200 is moved to an engaging position where it can engage with the bucket 13. When the cylinder 190 is further expanded from this state, the cylinder 190 expands to the maximum amount and the linking part 201 moves to the vicinity of the right vertical member 182.

By moving the left and right engaging parts 200 to the engaging position in this manner, a worker can fix the bucket 13 and the attachment portion 110 and can make the bucket 13 non-removable. Thus, a worker can mount the bucket 13 to the working tool mounting mechanism 100.

Moreover, by moving the left and right engaging parts 200 to the engaging position, the linking part 201 moves to a position opposing the opening 172. In this manner, a worker can visually recognize the rear surface (colored label) of the linking part 201 via the opening 172 from behind. Thus, the worker can confirm that the engaging part 200 has moved to the engaging position. Particularly in one or more embodiments, because the openings 172 are formed on both the left and right ends of the cover 170, when a worker sitting in the driver's seat visually recognizes the openings 172, it is less likely that the bonnet 7 is in the way. This makes it easier for the worker to visually recognize the openings 172 (linking part 201).

Furthermore, the hose H and piping connected to the cylinder 190 are guided together from the upper left portion of the cover 170 to the inside (see FIG. 4). Thus, the hose H and the like are not in the way when visually recognizing the opening 172 from the driver's seat, so the user can easily recognize the openings 172.

Note that when the bucket 13 is removed, the worker performs an operation opposite to that when the bucket 13 is mounted. More specifically, the worker first causes the cylinder 190 to contract. At this time, either the cylinder body 191 or the rod 192 illustrated in FIG. 13B, depending on which has smaller sliding resistance with the lock pin 202, moves before the other.

For example, as illustrated in FIG. 13A, when the sliding resistance of the right lock pin 202 is small, the rod 192 moves first. In accordance with this movement, the right lock pin 202 moves to the left and is pulled out from the boss portion 150 and the lower engaged portion 15. In this manner, the right engaging part 200 is moved from the engaging position to a release position where it cannot engage with the bucket 13. When the cylinder 190 is further contracted from this state, the linking part 201 abuts the right intermediate member 183 and the movement of the rod 192 is restricted. Afterward, the cylinder body 191 moves to the right, the left lock pin 202 is pulled out from the boss portion 150 and the like, and the left engaging part 200 moves from the engagement position to the release position.

When the left and right engaging parts 200 are moved to the release position in this manner, the linking parts 201 move to a displaced position to the left and right of the openings 172. Therefore, a worker can no longer visually recognize the rear surface of the linking part 201 from behind via the openings 172. Therefore, the worker ,can understand that the engaging part 20 has moved to the release position by confirming that the linking parts 201 cannot be visually recognized via the openings 172.

Moreover, the working tool mounting mechanism 100 can be appropriately moved in a state wherein the left and right lock pins 202 are pulled out from the boss portion 150 and the lower engaged portion 15 (state wherein the bucket 13 can be removed). As a result, the worker is able to release the engagement between the upper engaged portion 14 (see FIG. 2) of the bucket 13 and the linking shaft portion 120 of the working tool mounting mechanism 100 and remove the bucket 13 from the boom 12.

In this manner, the working tool mounting mechanism 100 of one or more embodiments can easily attach and detach the bucket 13 from the driver's seat using the extension and contraction of the cylinder 190, and can improve operability when attaching and detaching the bucket 13.

Moreover, the working tool mounting mechanism 100 can move the two engaging parts 200 using the cylinder 190 having one rod 192 (that is, a single rod cylinder). This eliminates the need to use, for example, a relatively expensive cylinder having two rods (that is, a dual-rod cylinder) or the like, and costs can therefore be reduced.

Moreover, the frame 180 respectively restricts the movement of the cylinder body 191 and the rod 192 in the left and right direction. As a result, when the engaging part 200 is moved by the cylinder 190 having one rod 192, switching of the engaging part 200 between the engagement position and the release position can be appropriately performed. Moreover, it is possible to prevent flaws such as the lock pin 202 coming out of the guide portion 140 from occurring.

Moreover, the frame 180 restricts the rotation of the cylinder 190. As a result, the posture (rotational position) of the cylinder 190 can be stabilized. Thus, flaws such as the port 191a provided in the cylinder 190, the hose H connected to the cylinder 190, and the like interfering with other members can be prevented from occurring.

In this manner, by restricting the movement and rotation in the left and right direction of the cylinder body 191 and the like by the frame 180, flaws accompanying the movement and rotation (such as flaws wherein the cylinder 190 comes out from the guide portion 140, and flaws wherein the hose H interferes) can be effectively prevented from occurring.

Furthermore, the cylinder body 191 moves in the left and right direction in accordance with the extension and contraction of the cylinder 190. Along with this movement, the port 191a also moves in the same direction. In one or more embodiments, a notch portion 181a is formed in the horizontal member 181 to form a gap between the horizontal member 181 and the port 191a (see FIG. 9), and the port 191a can be prevented from interfering with the horizontal member 181.

Moreover, when the notch portion 181a is provided in the horizontal member 181, the joint rod 210 cannot come into contact with the horizontal member 181 when the joint rod 210 is positioned in front of the notch portion 181a. Therefore, on the portion where the notch portion 181a is formed, the rotation of the joint rod 210 cannot be restricted by the horizontal member 181, and the cylinder 190 may rotate. In one or more embodiments, the auxiliary member 184 covering the notch portion 181a is provided, and the auxiliary member 184 is made to contact the joint rod 210 positioned in front of the notch portion 181a. With such a configuration, the joint rod 210 and the frame 180 can be made to contact, and the rotation of the cylinder 190 can be restricted regardless of the position of joint rod 210.

Furthermore, the cover 170 is provided to cover the cylinder 190. Thus, the cylinder 190 can be prevented from becoming dirty, and the cylinder 190 can be prevented from interfering with foreign objects.

As described above, the working tool mounting mechanism 100 according to one or more embodiments is provided with: a cylinder 190 that can expand and contract, being provided on a tip of a boom 12 of a front loader 10, and provided with a cylinder body 191 and a rod 192 provided so as to be able to slide with respect to the cylinder body 191; an engaging part 200 respectively provided on the cylinder body 191 and the rod 192, being able to move between an engagement position that can engage with a bucket 13 (working tool) that can be attached to and detached from a boom 12 and a release position that cannot engage with the bucket 13, according to the extension and contraction of the cylinder 190; a cover 170 for covering the cylinder 190 from one direction (behind); and a frame 180 (restricting portion) fixed to the cover 170, for restricting at least one of movement of the cylinder body 191 and the rod 192 in the extensible direction (left and right direction) past a predetermined position when the cylinder 190 expands and contracts, and rotation of the cylinder 190 around the axial direction (in one or more embodiments movement and rotation in the left and right direction are respectively restricted).

By configuring in this manner, the extension and contraction of the cylinder 190 can be used to attach and detach the bucket 13. As a result, for example, a worker can easily attach and detach the bucket 13 without getting out of the driver's seat, and the workability when attaching and detaching can be improved.

Moreover, by restricting the movement of the cylinder body 191 and the rod 192 in the extensible direction and the rotation of the cylinder 190, flaws accompanying the movement and rotation (such as flaws wherein the lock pin 202 comes out from the guide portion 140, and flaws wherein the hose H interferes) can be prevented from occurring.

Moreover, the frame 180 is formed in a frame shape that surrounds the cylinder 190 from the extensible direction and a direction perpendicular to the extensible direction (up and down direction) (see FIG. 12).

By forming the frame 180 in a frame shape in this manner, the strength of the frame 180 can be improved.

Furthermore, the engaging part 200 is provided with a linking part 201 respectively connected to the cylinder body 191 and the rod 192, and a lock pin 202 (extending part) extending from the linking part 201 in the extensible direction of the cylinder 190 and that can engage with the bucket 13, wherein the frame 180 restricts at least one of the movement of the cylinder body 191 and the rod 192 in the extensible direction or the rotation of the cylinder 190 around the axial direction (in one or more embodiments, movement in the extensible direction) by coming into contact with the linking part 201 (see FIG. 12).

By making the frame 180 and the linking part 201 come into contact in this manner, the movement or rotation of the cylinder 190 can be restricted.

Furthermore, the working tool mounting mechanism 100 is further provided with a joint rod 210 (fixing portion) for fixing the cylinder body 191 or the rod 192 and the linking part 201, wherein the frame 180 restricts at least one of the movement of the cylinder body 191 and the rod 192 in the extensible direction or the rotation of the cylinder 190 around the axial direction (in one or more embodiments, rotation around the axial direction) by coming into contact with the joint rod 210 (see FIG. 8).

By making the frame 180 and the joint rod 210 come into contact in this manner, the movement or rotation of the cylinder 190 can be restricted.

Furthermore, the joint rod 210 is provided to pass through the cylinder body 191 or the rod 192 and the linking part 201, and the frame 180 restricts the rotation of the cylinder 190 around the axial direction by respectively coming into contact with both ends of the joint rod 210 interposing the cylinder body 191 or the rod 192 and the linking part 201 (see FIG. 8).

By making the frame 180 come into contact with both ends of the joint rod 210 in this manner, the rotation of the cylinder 190 can be restricted in a stable manner.

Moreover, the lock pin 202 is disposed at a position eccentric with respect to the axis of the cylinder 190 (see FIG. 8).

By making the lock pin 202 and the cylinder 190 relatively eccentric in this manner, freedom in design can be improved such as preventing interference with other members.

Moreover, the cover 170 is provided with an opening 172 through which the position of the engaging part 200 can be visually recognized from the exterior (see FIG. 4).

By configuring in this manner, the current state of the engaging part 200 (whether it is positioned in the engagement position or the release position) can be easily understood.

Furthermore, the opening 172 is formed at a position where the linking part 201 moved to the engagement position is visually recognizable from the exterior and the linking part 201 moved to the release position is not visually recognizable from the exterior (see FIG. 12 and FIGS. 13A-13B).

By configuring in this manner, the state of the engaging part 200 (whether it is positioned in the engagement position or the release position) can be easily understood.

Note that the bucket 13 is the working tool according to one or more embodiments of the present invention. Furthermore, the frame 180 is the restricting portion according to one or more embodiments of the present invention. Furthermore, the lock pin 202 is the extending part according to one or more embodiments of the present invention. Furthermore, the joint rod 210 is a fixing portion according to one or more embodiments of the present invention.

The embodiments of the present invention have been described above, but the present invention is not limited to the above configuration and various modifications are possible within the scope of the invention.

For example, the working tool mounting mechanism 100 was made to mount the bucket 13 as a working tool in one or more embodiments, but the present invention is not limited to this. The working tool mounting mechanism 100 can mount various working tools such as forks, bale grabbers, and containers.

Moreover, the frame 180 was made to respectively restrict the movement of the cylinder 190 in the left and right direction and the rotation of the cylinder 190, but the present invention is not limited to this, and it is sufficient as long as it restricts at least one of the movement or the rotation. For example, from among the movement of the cylinder 190 in the left and right direction and the rotation of the cylinder 190, the frame 180 may restrict only the movement in the left and right direction. When restricting the movement of the cylinder 190 in the left and right direction in this manner, the rotation of the cylinder 190 may be restricted by a member other than the frame 180. Specifically, the rotation of the cylinder 190 may be restricted by spline-fitting the lock pin 202 and the guide portion 140, or the like.

Moreover, the frame 180 was made to restrict the movement of the cylinder 190 in the left and right direction by coming into contact with the linking part 201, but the present invention is not limited to this, and the rotation of the cylinder 190 may be restricted by coming into contact with the linking part 201. For example, the frame 180 may restrict the rotation of the cylinder 190 by making the inner surface of the horizontal member 181 come into contact with the upper surface and lower surface of the linking part 201.

Furthermore, the frame 180 was made to be formed in a frame shape, but the shape of the frame 180 is not particularly limited and can be freely modified.

Moreover, the opening 172 of the cover 170 was made to be formed so that the linking part 201 moved to the engagement position is visually recognizable, but the configuration of the opening 172 is not particularly limited as long as a worker can understand the position of the linking part 201. For example, the opening 172 may be formed so that the linking part 201 moved to the release position is visually recognizable.

Moreover, the linking part 201 was made to be formed in a substantially rectangular parallelepiped shape, but the shape of the linking part 201 is not limited to this and can be changed to any shape. Furthermore, the joint rod 210 was made to be formed in a cylindrical shape that extends up and down, but the shape of the joint rod 210 is not limited to this and can be changed to any shape.

Figure 14:
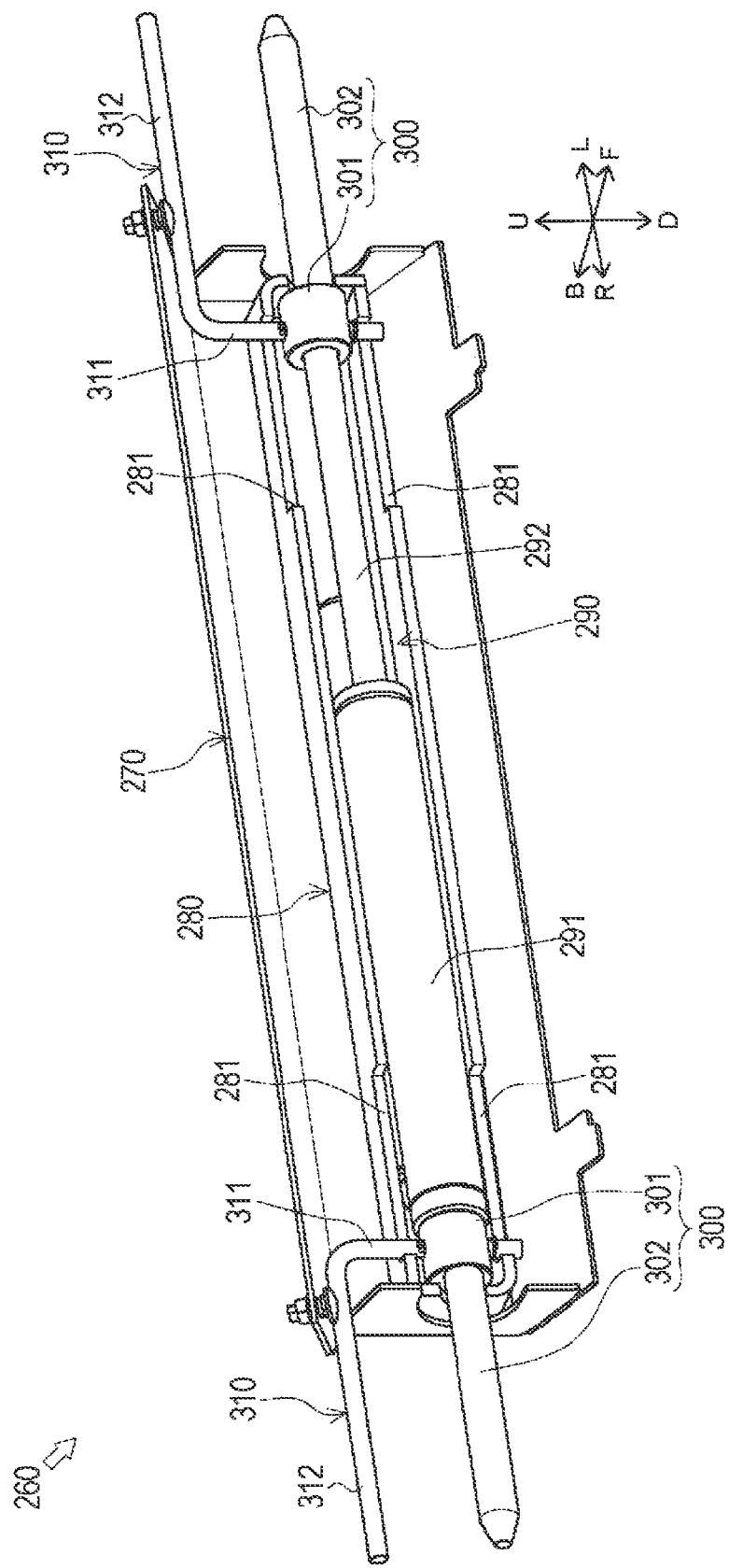
FIG. 14 is a perspective view illustrating a switching portion according to a working example.
Figure 15:
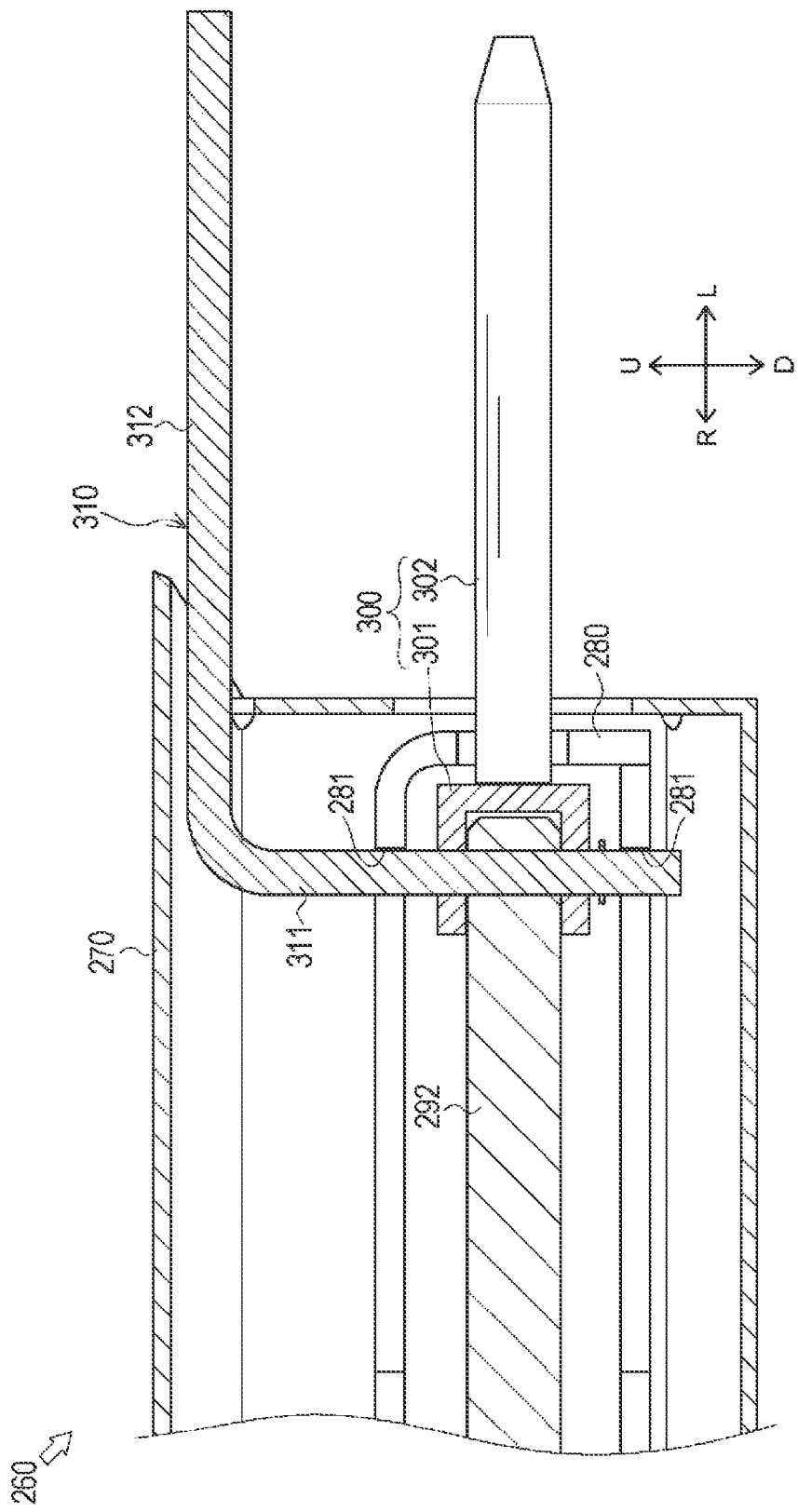
FIG. 15 is an expanded cross-sectional view of the above.

The switching portion 260 illustrated in FIG. 14 and FIG. 15 shows a working example of the switching portion 160 wherein the shape of a linking part 301 and a joint rod 310 or the like changed. The switching portion 260 according to the working example is provided with a cover 270, a frame 280, a cylinder 290, an engaging part 300, and a joint rod 310.

The cover 270 is formed in a substantial box shape having an open front surface. Upper ends on the left surface and the right surface of the cover 270 are formed so that the joint rod 310 can pass through.

The frame 280 is formed in a frame shape. A notch portion 281 is formed on the left end and right end on the upper surface of the frame 280 and the left end and right end on the lower surface of the frame 280.

The cylinder 290 is formed in the same manner as the cylinder 190 according to one or more embodiments with the exception that the cylinder body 291 is disposed on the right side and the rod 292 is disposed on the left side.

The engaging part 300 is formed similarly to the engaging part 200 according to one or more embodiments with the exception that the shape of the linking part 301 is formed in a substantially cylindrical shape.

The joint rod 310 is formed in a substantially inverted L shape having a first portion 311 extending up and down and a second portion 312 extending left and right. The first portion 311 of the left joint rod 310 is inserted into the linking part 301 and the rod 292. Moreover, the first portion 311 is disposed inside the upper and lower notch portions 281. The second portion 312 of the left joint rod 310 extends to the left from the upper end of the first portion 311. The right joint rod 310 is formed in left and right symmetry with the left joint rod 310. The right joint rod 310 is inserted into the cylinder body 291. The left and right joint rods 310 are appropriately colored in a color that is easy for a worker to visually recognize. On the second portion 312 of the joint rod 310, the portion from the tip (left and right outer ends) to the base end (left and right inner ends) is exposed to the exterior of the cover 270 when the cylinder 290 is extended. Therefore, the joint rod 310 becomes visually recognizable from behind when the cylinder 290 is extended.

The switching portion 260 according to the working example can move the joint rod 310 in the left and right direction by expanding and contracting the cylinder 290.

Moreover, the frame 280 can restrict the movement of the joint rod 310 using the notch portion 281.

By making the switching portion 260 according to the working example cause not the linking part 301, but the joint rod 310 to come into contact with the frame 280 (notch portion 281), the movement of the cylinder body 291 and the rod 292 in the left and right direction can be restricted.

Moreover, the second portion 312 of the joint rod 310 enters into the cover 270 when the cylinder 290 contracts, and changes from a visually recognizable state from behind to a non-visually recognizable state. By confirming whether the joint rod 310 is visually recognizable, a worker can easily determine whether the lock pin 302 is positioned at the engagement position or the release position.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A working tool mounting mechanism for a tractor, comprising:
    an extensible cylinder that:
        is disposed on a tip of a boom of a front loader of the tractor, and
        comprises a cylinder body and a rod slidable with respect to the cylinder body;
    engaging parts that:
        are respectively disposed on the cylinder body and the rod, and
        are each movable between an engagement position and a release position with extension and contraction of the extensible cylinder, wherein each of the engaging parts engages with a working tool detachably attached to the boom at the engagement position, and does not engage with the working tool at the release position;
    a cover that covers the extensible cylinder from one direction; and
    a frame that is fixed to the cover and restricts at least one of:
        movement of the cylinder body and the rod in an extensible direction exceeding a predetermined position with the extension and contraction of the extensible cylinder, and
        rotation of the extensible cylinder around an axial direction, wherein
    the engaging parts include:
        linking parts respectively coupled to the cylinder body and the rod, and
        extending parts extending from the linking parts in the extensible direction, and the frame contacts the linking parts and restricts at least one of the movement and the rotation.

2. The working tool mounting mechanism according to claim 1, wherein
    the frame surrounds the extensible cylinder from the extensible direction and a direction perpendicular to the extensible direction.

3. The working tool mounting mechanism according to claim 1, further comprising:
    joint rods that fix the linking parts to the cylinder body and the rod, wherein
    the frame contacts the joint rods and restricts at least one of the movement and the rotation.

4. The working tool mounting mechanism according to claim 3, wherein
    each of the joint rods passes through one of the linking parts and the cylinder body or the rod, and
    the frame restricts the rotation by contacting both ends of the joint rods between which each of the linking parts and the cylinder body or the rod are sandwiched.

5. The working tool mounting mechanism according to claim 1, wherein
    the extending parts are at positions each eccentric with respect to an axis of the extensible cylinder.

6. The working tool mounting mechanism according to claim 1, wherein
    the cover comprises an opening through which each of the engaging parts is visible from an exterior.

7. The working tool mounting mechanism according to claim 6, wherein
    the opening is at a position at which each of the linking parts at the engagement position is visible from the exterior, and at which each of the linking parts at the release position is not visible from the exterior.

* * * * *